(12) United States Patent
Mahkonen

(10) Patent No.: US 8,014,344 B2
(45) Date of Patent: Sep. 6, 2011

(54) MOBILE IPV6 ROUTE OPTIMIZATION IN DIFFERENT ADDRESS SPACES

(75) Inventor: Heikki Mahkonen, Helsinki (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 945 days.

(21) Appl. No.: 11/916,359

(22) PCT Filed: Jun. 3, 2005

(86) PCT No.: PCT/IB2005/001572
§ 371 (c)(1),
(2), (4) Date: Dec. 3, 2007

(87) PCT Pub. No.: WO2006/129136
PCT Pub. Date: Dec. 7, 2006

(65) Prior Publication Data
US 2008/0192758 A1  Aug. 14, 2008

(51) Int. Cl.
*H04W 4/00* (2009.01)
(52) U.S. Cl. ......... 370/328; 370/338; 370/401; 709/218
(58) Field of Classification Search .................. None
See application file for complete search history.

(56) References Cited

U.S. PATENT DOCUMENTS

| 7,483,697 B2 * | 1/2009 | Ohki .......................... 455/432.1 |
| 7,551,632 B2 * | 6/2009 | Thubert et al. ................. 370/401 |
| 7,623,499 B2 * | 11/2009 | Yahagi .......................... 370/338 |
| 2004/0013130 A1 * | 1/2004 | Blanchet et al. .............. 370/466 |
| 2005/0099976 A1 | 5/2005 | Yamamoto et al. |
| 2005/0152298 A1 * | 7/2005 | Thubert et al. ................. 370/312 |
| 2006/0140213 A1 * | 6/2006 | Hwang et al. .................. 370/466 |
| 2006/0215657 A1 * | 9/2006 | Lee et al. ....................... 370/389 |
| 2007/0133600 A1 * | 6/2007 | Tsuchiya et al. .............. 370/466 |

OTHER PUBLICATIONS

Larsson E Gustafsson, Ericsson, H. Levkowetz: T: "Use of MIPv6 in IPv4 and MIPv4 in IPv6 Networks" IETF Standard-Working-Draft, Internet Engineering Task Force, IETF, CH, Oct. 18, 2004, XP015031377, ISSN: 0000-0004, pp. 5-6, Page 11, Paragraph 5.4, p. 13, Paragraph 5.8, p. 17-18, Paragraph 6.6.

Finney J et al: "Mobile 4-in-6: a novel IPf4 / IPv6 transitioning mechanism for mobile hosts" Wireless Communications and Networking Conference, 2005 IEEE New Orleans, LA. USA. Mar. 13, 2005, Piscataway, NJ, USA, IEEE. Mar. 13, 2005, pp. 1427-1433, XP010791387. ISBN: 0-7803-8966-2 p. 1428, right-hand column, paragraph 2-4.

Blanchet F Parent Hexago M: "IPv6 Tunnel Broker with the Tunnel Setup Protocol (TSP)" IETF Standard-Working-Draft, Internet Engineering Task Force, IETF CH, No. 2, May 12, 2005, XP015037626, ISSN: 0000-0004, Abstract, p. 4, paragraphs 2,3, p. 6, paragraphs 2.2, 2.3, p. 7, paragraph 4.1, p. 16, paragraph 4.5, p. 24, paragraph 6.6.

* cited by examiner

*Primary Examiner* — Bob Phunkulh

(57) ABSTRACT

A route optimization method (300, 600) is described herein which is used by an IPv6 mobile node (402, 702) to communicate with another IPv6 node (404, 704) by transmitting and receiving IPv6 traffic within an IPv4/UDP bi-directional tunnel (407, 707) through an IP network (412, 712) without routing the IPv6 traffic through a home agent (410, 708) of the mobile node, wherein at least one of the IPv6 mobile node and the another IPv6 node is located in an IPv4 access network (406a, 406b, 716a, 718b).

22 Claims, 10 Drawing Sheets

MOBILE IPV6 ROUTE OPTIMIZATION IN DIFFERENT ADDRESS SPACES

BACKGROUND OF THE INVENTION

1. Field of the Invention

The present invention relates to an IPv6 mobile node that can move to an IPv4-only access network and still retain its reachability to another IPv6 node located in a different address space.

2. Description of Related Art

The following abbreviations are herewith defined, at least some of which are referred to in the ensuing description of the prior art and the preferred embodiments of the present invention.

MN Mobile Node is a mobile terminal which can communicate with other moving or stationary nodes using its home address while it is changing its attachment point to the Internet (IP network).

HA Home Agent is a router in the MN's home network.

CN Correspondent Node is an IPv6 node. The MN is also a CN but CN could also be a node which doesn't move at all.

NAT Network Address Translator.

CoA Care-of Address is an IPv6 or IPv4 address which is used by the MN in the visiting network. This address changes as the MN changes its attachment to the Internet. When the MN is attached to an IPv4 access network it also needs a UDP port number together with its IPv4 CoA. This is because the IPv4 tunnelling could be going through one or more NATs and they need the UDP port to perform the address translation.

HoA Home Address of the MN is the IPv6 or IPv4 address it is always reachable from. If the MN is not in a home link the HA will tunnel the packets to the MN which arrive to the HoA of the MN.

HL Home link.

HoTI Home Test Init.

HoT Home Test.

CoTI Care-of Test Init.

CoT Care-of Test.

BU Binding Update.

BA Binding Acknowledgement.

In the wireless communications field, a protocol known as Mobile IPv6 is used today which allows IPv6 MNs to remain reachable while moving around in IPv6 access networks connected to an IP network like the Internet. Without this mobility support, packets destined to an IPv6 MN would not be able to reach it while it is located away from its home link. The Mobile IPv6 protocol is described in detail in the following documents:

S. Deering et al., "Internet Protocol, Version 6 (IPv6) Specification", RFC 2460, December 1998.

D. Johnson et al., "Mobility Support in IPv6", RFC 3775, June 2004.

The contents of these documents are incorporated by reference herein.

In addition to the IPv6 access networks, there are also IPv4 access networks in use today that are connected to the Internet. The IPv4 access networks are designed and made in accordance with another protocol known as Mobile IPv4. The Mobile IPv4 protocol enables an IPv4 MN to be reached while it is located in an IPv4 access network that is not its HL. The Mobile IPv4 protocol is described in detail in the following document:

C. Perkins, "IP Mobility Support", RFC 2002, October 1996.

The contents of this document are incorporated by reference herein.

Unfortunately, the Mobile IPv4 and Mobile IPv6 protocols are designed for IPv4-only access networks and IPv6-only access networks, respectively. As such, the Mobile IPv6 protocol does not provide backwards compatibility to IPv4 networks. This means that Mobile IPv6 is not capable of mobility management across IPv4 (public and private) access networks. However, mobility management of IPv6 MNs located in IPv4 (public and private) access networks is particularly important. Because, IPv6 MNs (e.g., IPv6 mobile computers) are likely to account for a majority or at least a substantial fraction of the population of the devices that are going to be connected to the Internet. And, some of the access networks to the Internet will be IPv4-only access networks. A proposed solution to this mobility management problem is described in detail below with respect to FIGS. 1 and 2.

Referring to FIGS. 1A and 1B (PRIOR ART), there is shown a diagram and a signaling flow diagram used to help explain a solution to the mobility management problem in a scenario where an IPv6 MN 110 moves to an IPv4-only access network 116 and can still retain its reachability to an IPv6 CN 102. As shown in FIG. 1A, the IPv6 CN 102 is located in a mixed IPv4/IPv6 access network 104 which has an IPv4 router 106 and an IPv6 router 108. And, the MN 110 moved from a HL 112 which has a HA 114 to an IPv4 access network 116 which has an IPv4 router 118. The MN 110 is able to communicate with the CN 102 via the Internet 120 as discussed next.

As shown in FIGS. 1A and 1B, the MN 110 performs a home registration with the HA 114 after it moves from the HL 112 to the IPv4 access network 116 (see signals 1 and 2). To perform the home registration, the MN 110 sends a BU to the HA 114 (signal 1). Since, the MN 110 is located in the IPv4 access network 116 it adds an IPv4 Care-of address option to the BU to learn its global IPv4 address and UDP port. Then, the HA 114 sends the MN 110 a BA which carries the IPv4 Care-of address option holding the MN's global IPv4 address and UDP port (signal 2). After the home registration, the CN 102 sends traffic (tunneled data) to the MN 110 via the HL 112 (see signal 3). The MN 110 also sends traffic (tunneled data) to the CN 102 via the HL 112 (see signal 4). In addition, the MN 110 has a routing table 122. An exemplary routing table 122 is provided below:

| MN's Routing Table 122: | | |
|---|---|---|
| Destination: | Next hop: | Intf: |
| "HA IPv6" | "HA IPv4" | UDP tunnelintf0 |
| "HA IPv4" | "default IPV4 router" | Intf0 |

A drawback of this solution is that the incoming and outgoing traffic for the MN 110 is always tunneled via the HA 114 which resides in the HL 112. The same traffic route would still be needed even if the CN 102 and the MN 110 were located in the same access network. This is because the CN 102 and MN 110 cannot engage in a route optimization procedure where the traffic is routed via the shortest path (MN 110, IPv4 router 118, Internet 120, IPv4 router 106, CN 102) since the CN 102 and MN 110 may loose connectivity when the MN 110 moves to another access network (not shown in picture). It would be desirable if the MN 110 and CN 102 could engage in a route optimization procedure. This need is addressed by the present invention.

Referring to FIGS. 2A and 2B (PRIOR ART), there is shown a diagram and a signaling flow diagram used to help explain a solution to the mobility management problem in a scenario where an IPv6 MN 202 retains its reachability to another IPv6 MN 212 even when both IPv6 MNs 202 and 212 move to IPv4-only access networks 204 and 214. As shown in FIG. 2A, the first IPv6 MN 202 is located in an IPv4 access network 204 which has an IPv4 router 206. The first MN 202 moved to the IPv4 access network 204 from a HL 208 which has a HA 210. The second IPv6 MN 212 is located in an IPv4 access network 214 which has an IPv4 router 216. The second MN 212 moved to the IPv4 access network 214 from a HL 218 which has a HA 220. And, the first MN 202 is able to communicate with the second MN 212 via the Internet 222 and the HAs 210 and 220 as discussed next.

As shown in FIGS. 2A and 2B, the first MN 202 performs a home registration with the HA 210 after it moves from the HL 208 to the IPv4 access network 204 (see signals 1*a* and 1*b*). To perform the home registration, the first MN 202 sends a BU to the HA 210 (signal 1*a*). Since, the first MN 202 is located in the IPv4 access network 204 it adds an IPv4 Care-of address option to the BU to learn its global IPv4 address and UDP port. Then, the HA 210 sends the MN 202 a BA which carries the IPv4 Care-of address option holding the MN's global IPv4 address and UDP port (signal 2*a*). Likewise, the second MN 212 sends a BU to the HA 220 (signal 1*b*). Since, the second MN 212 is located in the IPv4 access network 214 it adds an IPv4 Care-of address option to the BU to learn its global IPv4 address and UDP port. Then, the HA 220 sends the MN 212 a BA which carries the IPv4 Care-of address option holding the MN's global IPv4 address and UDP port (signal 2*b*). After the home registration, the second MN 212 sends traffic (tunneled data) to the first MN 202 via the two HLs 218 and 208 (see signal 3). The first MN 202 also sends traffic (tunneled data) to the second MN 212 via the two HLs 208 and 218 (see signal 4). In addition, the MN 202 and 212 each have a routing table 224 and 226. Exemplary routing tables 224 and 226 are provided below:

| MN1 Routing Table 224: | | |
|---|---|---|
| Destination: | Next hop: | Intf: |
| "HA1 IPv6" | "HA1 IPv4" | UDP tunnelintf0 |
| "HA1 IPv4" | "default IPV4 rouler" | Intf0 |

| MN2 Routing Table 226: | | |
|---|---|---|
| Destination: | Next hop: | Intf: |
| "HA2 IPv6" | "HA2 IPv4" | UDP tunnelintf0 |
| "HA2 IPv4" | "default IPV4 router" | Intf0 |

A drawback of this solution is that the incoming and outgoing traffic between MN 202 and MN 212 needs to be tunneled via two HAs 210 and 220 which reside in the HLs 208 and 218. The same traffic route would still be needed even if both MNs 202 and 212 were located in the same access network. This is because the MNs 202 and 212 can not engage in a route optimization procedure where the traffic is routed via the shortest path (MN 202, IPv4 router 206, Internet 222, IPv4 router 216, MN 212) since the MNs 202 and 212 may loose connectivity when either or both of them move to an IPv4 network 204 and 214. It should be noted that the two MNs can not optimize the routing between them even if they are in IPv6 access networks because one of them might at any time move to an IPv4 access network. It would be desirable if the MNs 202 and 212 could engage in a route optimization procedure. This need is addressed by the present invention.

BRIEF DESCRIPTION OF THE INVENTION

The present invention includes a route optimization method which is used by an IPv6 mobile node to communicate with another IPv6 node by transmitting and receiving IPv6 traffic within an IPv4/UDP bi-directional tunnel through an IP network without routing the IPv6 traffic through a home agent of the IPv6 mobile node, wherein at least one of the IPv6 mobile node and the another IPv6 node is located in an IPv4 access network.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 3-8, there are disclosed two embodiments of a route optimizing method 300 and 600 in accordance with the present invention. To aid in the discussion of the route optimizing methods 300 and 600, several different exemplary networks are used herein which include well known components like an IPv4 access network, IPv6 access network, IPv4/IPv6 access network, HL, HA, IP network (Internet), IPv4 router, IPv6 router etc . . . . For clarity, the description provided herein omits certain details about the well known components that are not necessary to understand the present invention.

Figure 3:
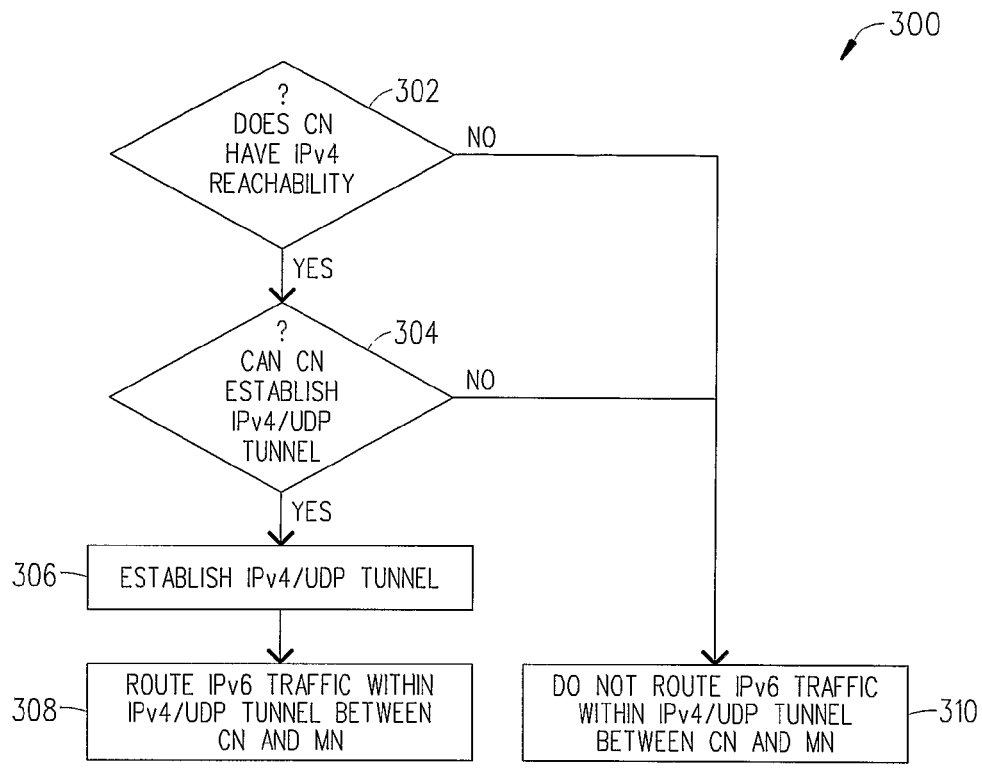
FIGS. 3-5 show several diagrams that are used to help describe a solution in accordance with one embodiment of the present invention which does use a route optimizing method to address the mobility management problem in a scenario where an IPv6 MN moves to an IPv4-only access network and still retains its reachability to an IPv6 CN.
Figure 4B:
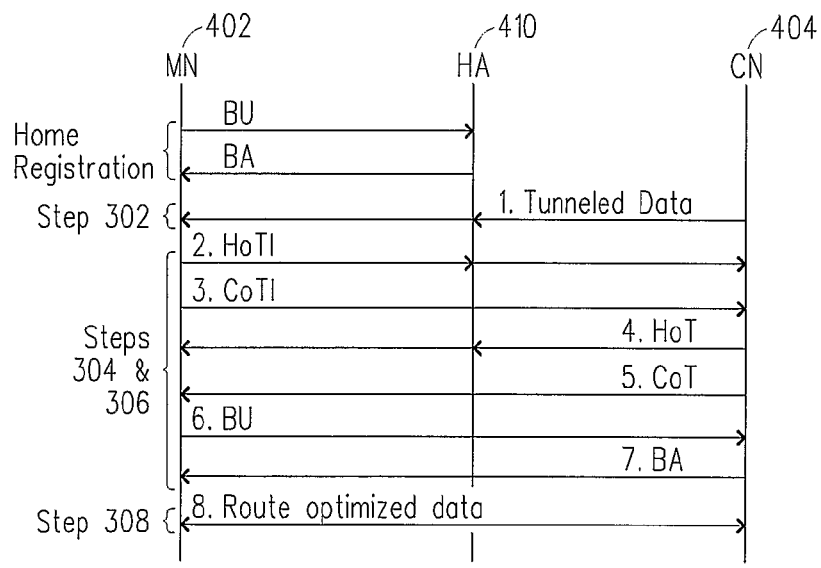
Figure 4A:
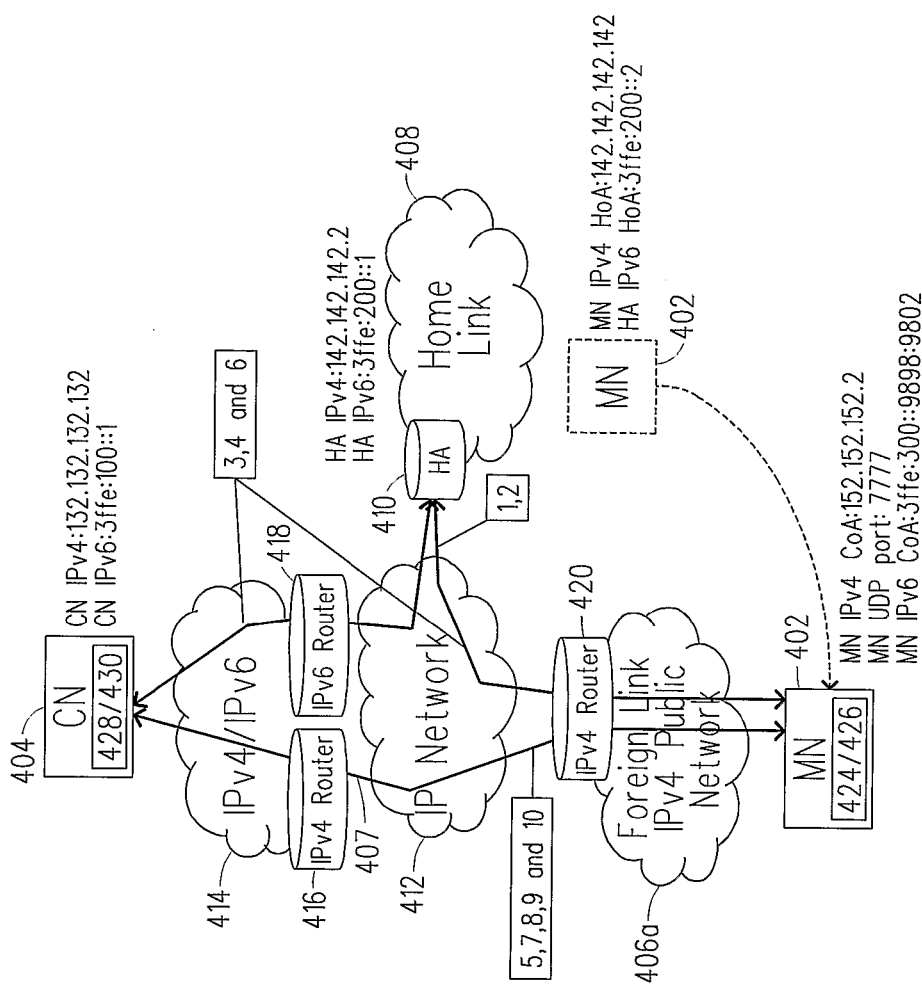
Figure 5:
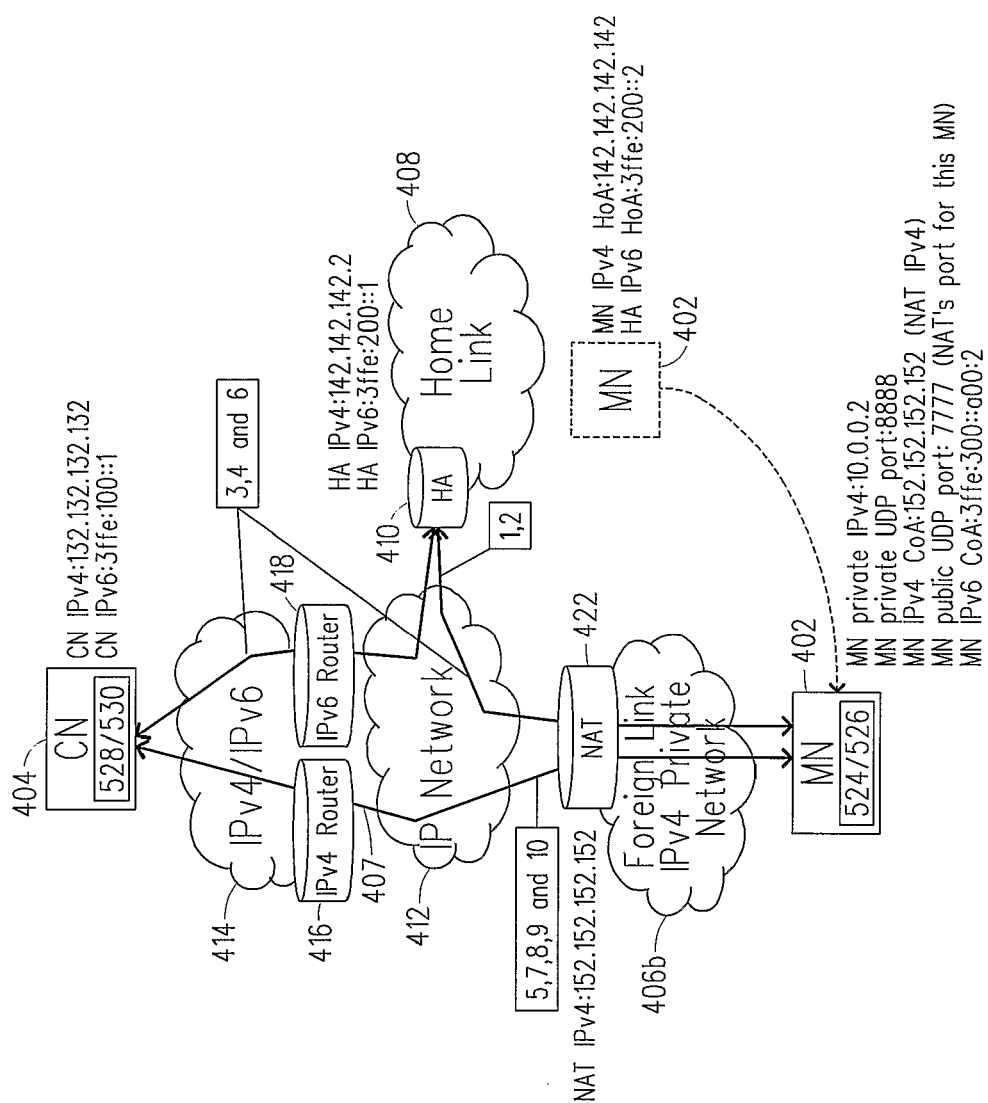

Referring to FIGS. 3-5, there are shown several diagrams that are used to help describe the first embodiment of the route optimizing method 300 in accordance with the present invention. Basically, the route optimizing method 300 enables an IPv6 MN 402 to move to an IPv4-only access network 406*a* and 406b and still retain its reachability to an IPv6 CN 404. In this solution, the route optimization method 300 can work between the MN 402 and the CN 404 in different address spaces with some assumptions. First, the MN 402 and CN 404 both need to be a dual stack node meaning that they both have an IPv4 address and an IPv6 address. Also, the MN 402 and CN 404 must support tunneling of IPv6 traffic in an IPv4/UDP bi-directional tunnel. In addition, the MN 402 and CN 404 have to know their own globally routable IPv4 address and UDP port for the tunneling.

While, the MN 402 is attached to its HL 408 it can communicate with the CN 404 directly by using the CN's IPv6 address and its own IPv6 home address (this situation is not shown in the scenarios of FIGS. 4 and 5). When the MN 402 moves to a foreign network, where it can obtain IPv6 connectivity, it would normally start the traditional route optimization procedure between itself and the CN 404 (this situation is not shown the scenarios in FIGS. 4 and 5). When the MN 402 is used in an environment where the IPv6 connectivity can't be ensured like when it moves to an IPv4 access network 406, then the route optimization method 300 needs to be used so that there is a possibility that the IPv6 traffic can be efficiently routed between the MN 402 and CN 404 (this situation is shown in the scenarios of FIGS. 4 and 5). In other words, the MN 402 should use the route optimization method 300 (and method 600) because it has no prior knowledge if it is moving to an IPv4 or an IPv6 access network.

Figure 1A:
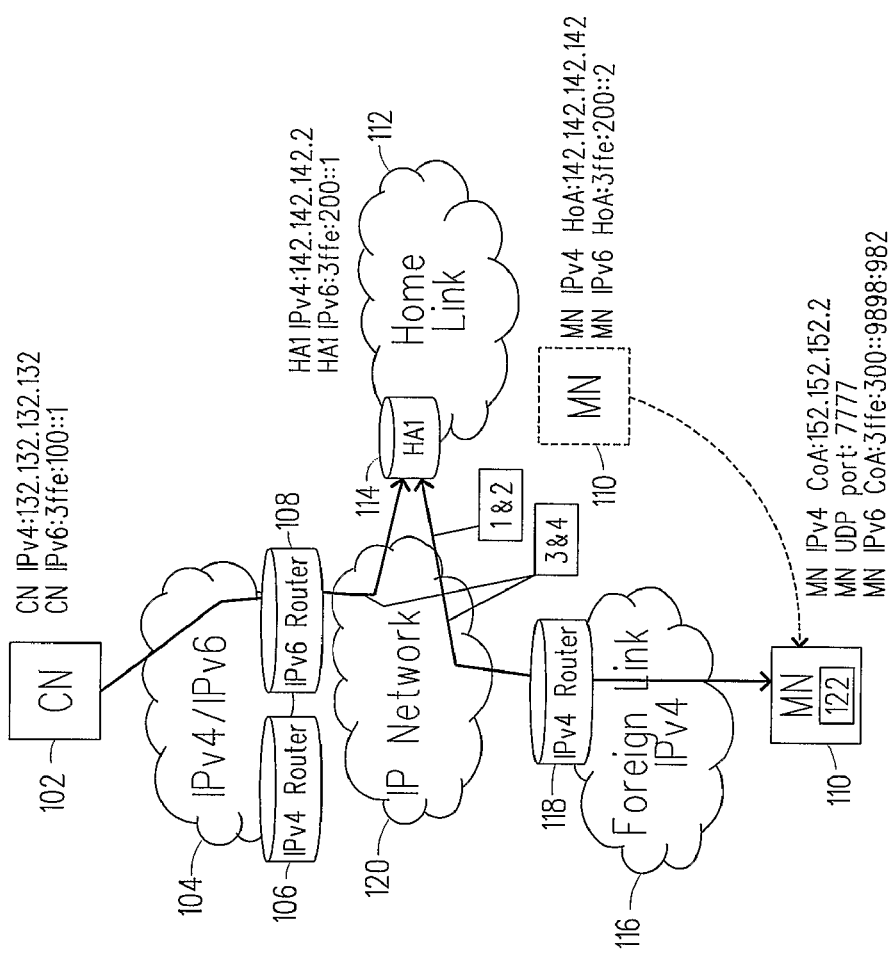
FIGS. 1A and 1B (PRIOR ART) show two diagrams that are used to help explain a known solution which does not use a route optimization procedure to address the mobility management problem in a scenario where an IPv6 MN can move to an IPv4-only access network and still retain its reachability to an IPv6 CN.
Figure 1B:
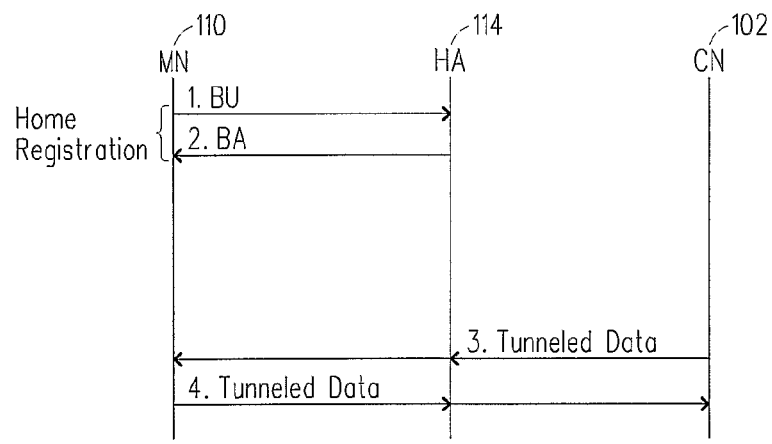

Prior to discussing how the route optimization method 300 can be used in two different scenarios which are shown FIGS. 4 and 5, a brief discussion is provided about the basic steps of the route optimization method 300. First, the MN 402 determines the IPv4 reachability of the CN 404 by checking if the CN 404 is sending the IPv4 Care-of Address option in its traffic which is sent through a HA 410 to the MN 402 (see step 302 in FIG. 3)(see also FIGS. 4 and 5). If yes, then MN 402 determines if the CN 404 can establish an IPv4/UDP bi-directional tunnel 407 through the Internet 412 directly between the MN 402 and CN 404 (see step 304 in FIG. 3). If yes, then the MN 402 establishes the IPv4/UDP bi-directional tunnel 407 with the CN 404 (see step 306 in FIG. 3). Thereafter, the IPv6 traffic is routed within the IPv4/UDP bi-directional tunnel 407 back-and-forth between the MN 402 and CN 404 (see step 308 in FIG. 3). If the determination in either of the steps 302 and 304 is no, then the IPv4/UDP bi-directional tunnel 407 can not be established and the MN 402 must send/receive the IPv6 traffic to/from the CN 404 through both the Internet 412 and the HA 410 (see step 310 in FIG. 3) (see FIG. 1A). A description about how steps 302, 304 . . . 308 can be implemented is described in detail below with respect to the two scenarios shown in FIGS. 4 and 5.

Referring to FIGS. 4A and 4B, there are shown a diagram and a signaling flow diagram which are used to help explain how the route optimization method 300 can be used by the IPv6 MN 402 so it can retain its reachability to the IPv6 CN 404 even after the MN 402 moves to an IPv4-public access network 406a. As shown in FIG. 4A, the CN 404 is located in a mixed IPv4/IPv6 access network 414 which has an IPv4 router 416 and an IPv6 router 418. And, the MN 402 moved from the HL 408 to the IPv4-public access network 406a which has an IPv4 router 420. The MN 402 is able to communicate with the CN 404 through the IPv4/UDP bi-directional tunnel 407 via the Internet 412 as discussed next.

As shown in FIGS. 4A and 4B, the MN 402 performs a home registration with the HA 410 after it moves from the HL 408 to the IPv4-public access network 406a. To perform the home registration, the MN 402 sends a BU to the HA 410. Since, the MN 402 is located in the IPv4-public access network 406a it adds an IPv4 Care-of address option to the BU to learn its global IPv4 address and UDP port. Next, the HA 410 sends the MN 402 a BA which carries the IPv4 Care-of address option holding the MN's global IPv4 address and UDP port. After the home registration, the traffic between the MN 402 and the CN 404 can be route optimized in accordance with method 300 as follows:

1. Tunneled data: The MN 402 receives tunneled traffic from the CN 404 which includes the IPv4 Care-of Address option carrying the IPV4 address and the UDP port of the CN 404. Upon receipt of this information, the MN 402 starts the route optimization procedure towards the CN 404.
2. HoTI: If the MN 402 knows the IPv4 address of the CN 404 it will send the HoTI message to the CN 404. The HoTI message is tunneled via the HA 410 to the CN 404. In the HoTI message, one bit from the reserved field is set and used as a flag to inform the CN 404 that the MN 402 might want to tunnel traffic between the two nodes 402 and 404.
3. CoTI: If the MN 402 knows the IPv4 address of the CN 404 it can send the CoTI message within the IPv4/UDP tunnel 407 directly to the CN 404. In the CoTI message, one bit from the reserved field is set and used as a flag to let the CN 404 know that the MN 402 might want to tunnel traffic between the two nodes 402 and 404.
4. HoT: The CN 404 answers the HoTI message sent by the MN 402 with the HoT message. The HoT message is sent to the IPv4/IPv6 HoA of the MN 402 and is tunnelled to the MN 402 via the HA 410. The CN 404 sets a flag in the reserved field of the CoT message if it is capable of tunneling IPv6 packets inside an IPv4/UDP tunnel 407.
5. CoT: The CN 404 answers the CoTI message sent by the MN 402 with the CoT message. The CoT message is tunneled within the IPv4/UDP tunnel 407 to the IPv4 address of the MN 402. The CN 404 sets a flag in the reserved field in CoT message to let the MN 402 know it is capable of tunneling IPv6 packets inside an IPv4/UDP tunnel 407. For the MN 402 to receive the arriving CoT message it has to listen to the UDP port it uses for tunnelling IPv6 traffic inside the IPv4/UDP tunnel 407. In particular, the MN 402 listens to its private IPv4 address and UDP port.
6. BU: When the MN has received the HoT and CoT messages (which have the specified flag bit set) the MN 402 tunnels the BU message to the CN 404 inside the IPv4/UDP tunnel 407. The MN 402 also updates its Binding Update List (BUL) entry for the corresponding CN 404 (see FIG. 4A). If any one of the flags in the reserved fields of the HoT and CoT messages were not set, then the MN won't send the BU and the traffic will not be route optimized between the two nodes 402 and 404.
7. BA: When the CN 404 receives the BU it creates an entry to its Binding Cache (BC) for the MN 402 and it also adds an entry for the IPv4/UDP bi-directional tunnel 407 to its routing table (see FIG. 4A). After the BC entry is created, the CN 404 sends the BA message to the MN 402. The BA message is sent through the IPv4/UDP bi-directional tunnel 407 directly to the MN 402.
8. Route Optimized data: After the successful exchange of BU and BA messages, the MN 402 and CN 404 can tunnel all the IPv6 traffic between them inside the IPv4/UDP tunnel 407.

As can be seen, the aforementioned route optimization procedure includes the use of the HoTI, CoTI, HoT, CoT, BU and BA messages. Details about these messages are well known and can be found in the following document:

Johnson, Perkins, Arkko: "Mobility Support in IPv6", RFC 3775, June 2004.

The contents of this document is incorporated by reference herein.

The MN 402 includes a routing table 424 and a binding update list 426. And, the CN 404 includes a routing table 428 and a binding cache 430. Exemplary routing tables 424 and 428, binding update list 426 and a binding cache 430 are provided below:

| MN's Routing Table 424: | | |
|---|---|---|
| Destination: | Next hop: | Intf: |
| "HA IPv6" | "HA IPv4" | UDP tunnelintf0 |
| "CN IPv6" | "CN IPv4" | UDP tunnelintf1 |
| "HA IPv4" | "default IPv4 router" | intf0 |
| "CN IPv4" | "default IPv4 router" | Intf0 |

| MN's Binding Update List 426: |
|---|
| "CN IPv6" <-> "MN IPv6 CoA" <-> "MN IPv6 HoA" <-> "HA IPv6" |
| "CN IPv4" <-> "MN IPv4 CoA" <-> "MN IPv4 HoA" <-> "HA IPv4" |

| CN's Routing Table 428: | | |
|---|---|---|
| Destination: | Next hop: | Intf: |
| "MN IPv6 CoA" | "MN IPv4 CoA" | UDP tunnelintf0 |
| "MN IPv4 CoA" | default IPv4 router | Intf0 |

| CN's Binding Cache 430: |
|---|
| "MN IPv6" HoA" <-> "MN IPv6 CoA" |
| "MN IPv4" HoA" <-> "MN IPv4 CoA" |

It should be noted that if the CN 404 does not support the tunneling of the IPv6 traffic inside an IPv4/UDP tunnel 407, then the MN 402 can not perform the route optimization with the CN 404 even if the MN 402 is attached to an IPv6 access network. This is because the MN 402 can not guarantee that it will not move to an IPv4 access network 406. It should also be noted that the present invention can also be used if anyone of the MNs is connected to an intranet, extranet and even if anyone of the MNs is connected to an intranet/extranet which is then connected to the Internet.

Referring to FIG. 5, there is shown a diagram used to help explain how the route optimization method 300 can be used by the IPv6 MN 402 so it can retain its reachability to the IPv6 CN 404 even after the MN 402 moves to an IPv4-private access network 406b. As shown in FIG. 5, the CN 404 is located in a mixed IPv4/IPv6 access network 414 which has an IPv4 router 416 and an IPv6 router 418. And, the MN 402 moved from the HL 408 to the IPv4-private access network 406b which has a network address translator (NAT) 422.

The MN 402 is able to communicate with the CN 404 via the IPv4/UDP bi-directional tunnel 407 as discussed above with respect to FIGS. 4A and 4B except that in this case the home registration procedure is different due to the presence of the NAT 422. The difference in the home registration procedure is described next. When the MN 402 discovers that it is attached to an IPv4-private access network 406b it sends a BU message to it's HA 410. The MN 402 adds the "IPv4 Care-of Address Option" to the BU message. In particular, the MN 402 uses its IPv4 address as the care-of address and the source UDP port as the UDP port. Because, the IPv4-private access network 406b is behind NAT 422, the option will not get translated since it is inside the IPv6 header and these headers are encrypted with IPSec. Thus, when the HA 410 receives the BU it compares the source address and UDP port of the outer headers of the tunneled packet with the IPv4 address and UDP port in the "IPv4 Care-of Address Option". If they are different, then the HA 410 copies the IPv4 source address and UDP port of the NAT 422 to the option from the received IPv4 header. This option is added into the BA which is sent back to the MN 402. In this way, when MN 402 receives the BA it will know if it is situated behind a NAT 422. In addition, MN 402 knows the globally routable IPv4 address and the UDP port which are needed for tunneling IPv6 traffic inside the IPv4/UDP tunnel 407. In addition, the MN 502 includes a routing table 524 and a binding update list 526. And, the CN 404 includes a routing table 528 and a binding cache 530. Exemplary routing tables 524 and 528, binding update list 526 and a binding cache 530 are provided below:

| MN's Routing Table 524: | | |
|---|---|---|
| Destination: | Next hop: | Intf: |
| "HA IPv6" | "HA IPv4" | UDP tunnelintf0 |
| "CN IPv6" | "CN IPv4" | UDP tunnelintf1 |
| "HA IPv4" | "default IPv4 router" | intf0 |
| "CN IPv4" | "default IPv4 router" | Intf0 |

| MN's Binding Update List 526: |
|---|
| "CN IPv6" <-> "MN IPv6 CoA" <-> "MN IPv6 HoA" <-> "HA IPv6" |
| "CN IPv4" <-> "MN IPv4 CoA" <-> "MN IPv4 HoA" <-> "HA IPv4" |

| CN's Routing Table 528: | | |
|---|---|---|
| Destination: | Next hop: | Intf: |
| "MN IPv6 CoA" | "MN IPv4 CoA" | UDP tunnelintf0 |
| "MN IPv4 CoA" | default IPv4 router | Intf0 |

| CN's Binding Cache 530: |
|---|
| "MN IPv6" HoA" <-> "MN IPv6 CoA" |
| "MN IPv4" HoA" <-> "MN IPv4 CoA" |

Figure 6:
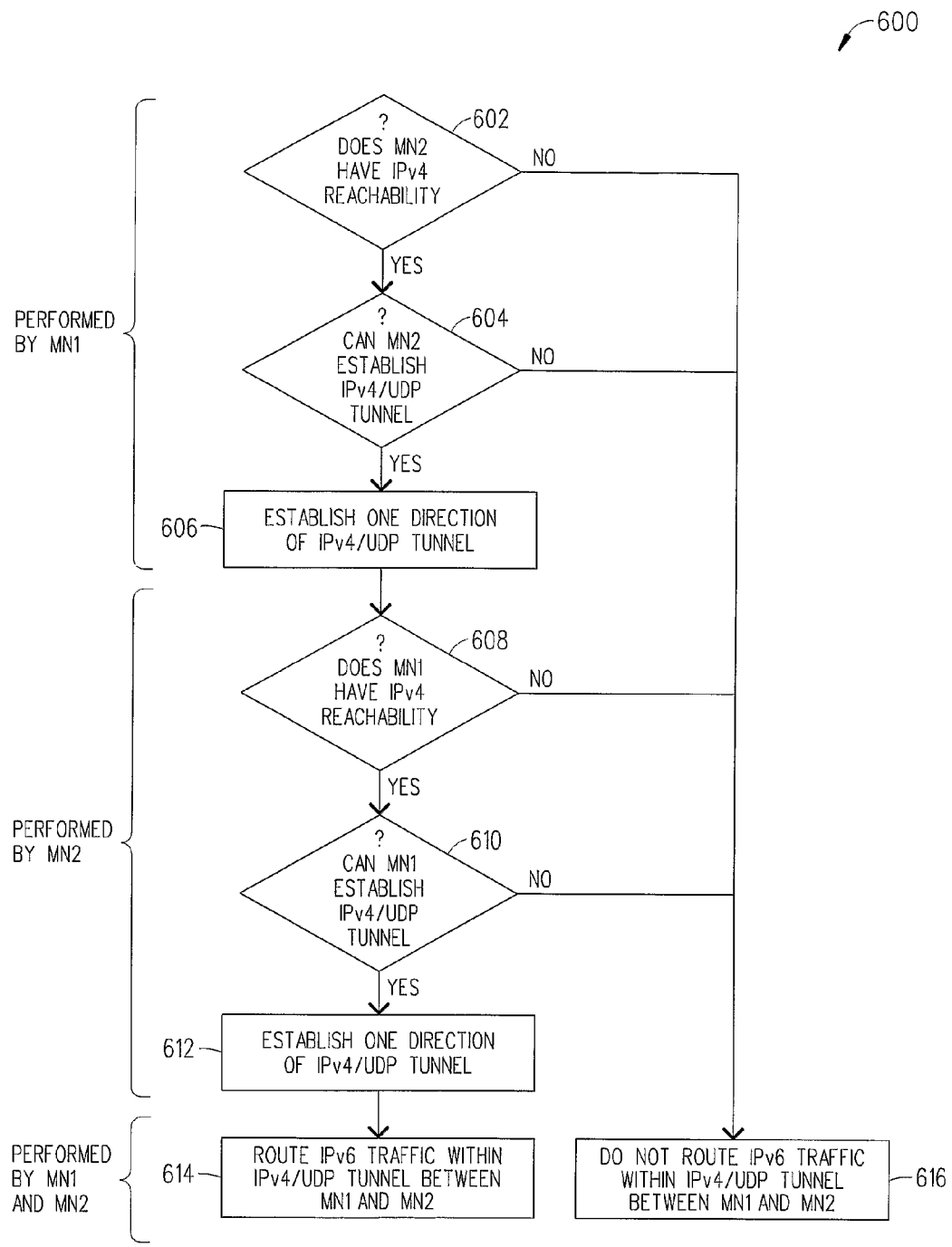
FIGS. 6-8 show several diagrams that are used to help describe a solution in accordance with another embodiment of the present invention which does use a route optimizing method to address the mobility management problem in a scenario where an IPv6 MN retains its reachability to another IPv6 MN even when both IPv6 MNs move to IPv4-only access networks.
Figure 7A:
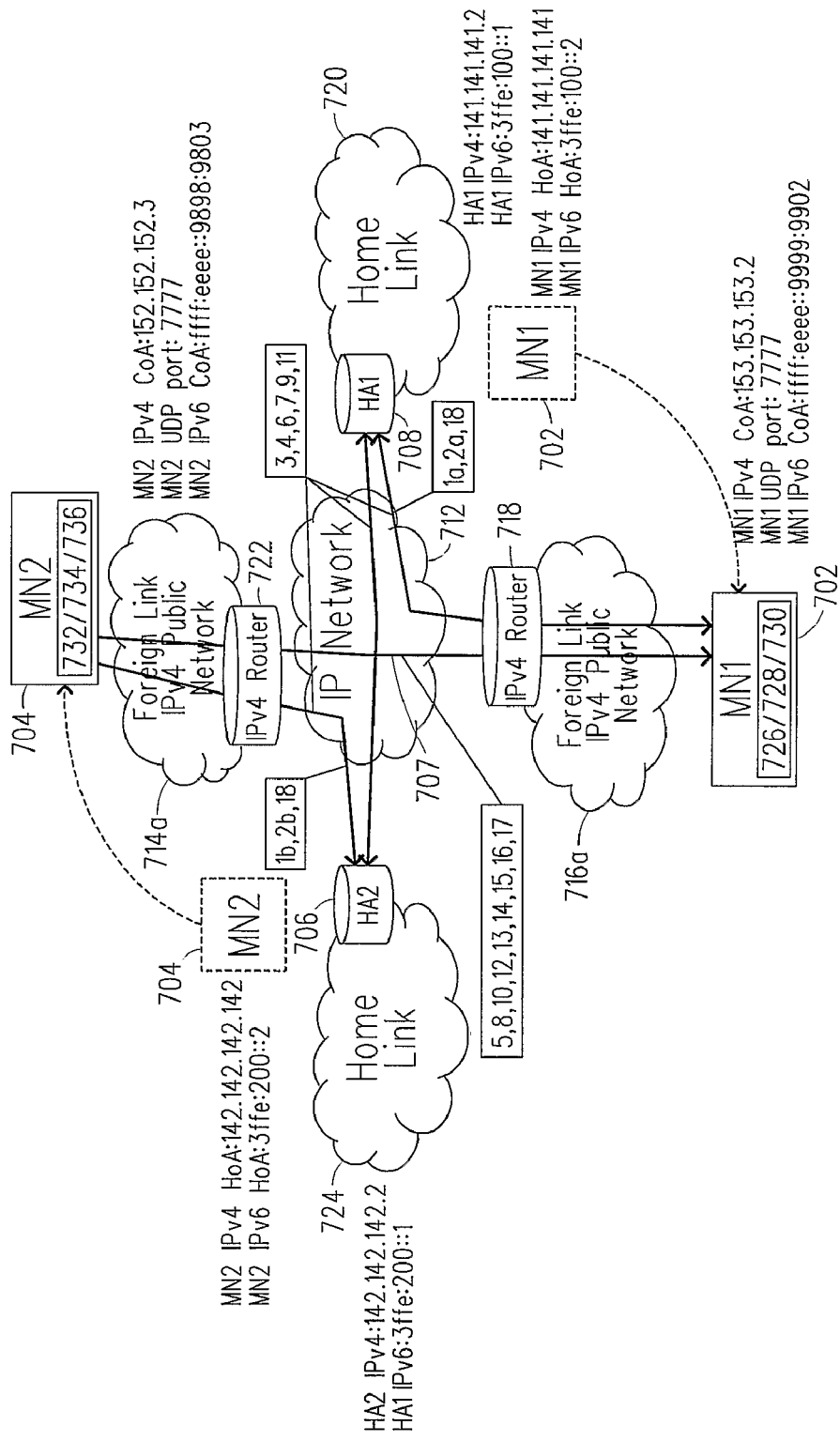
Figure 7B:
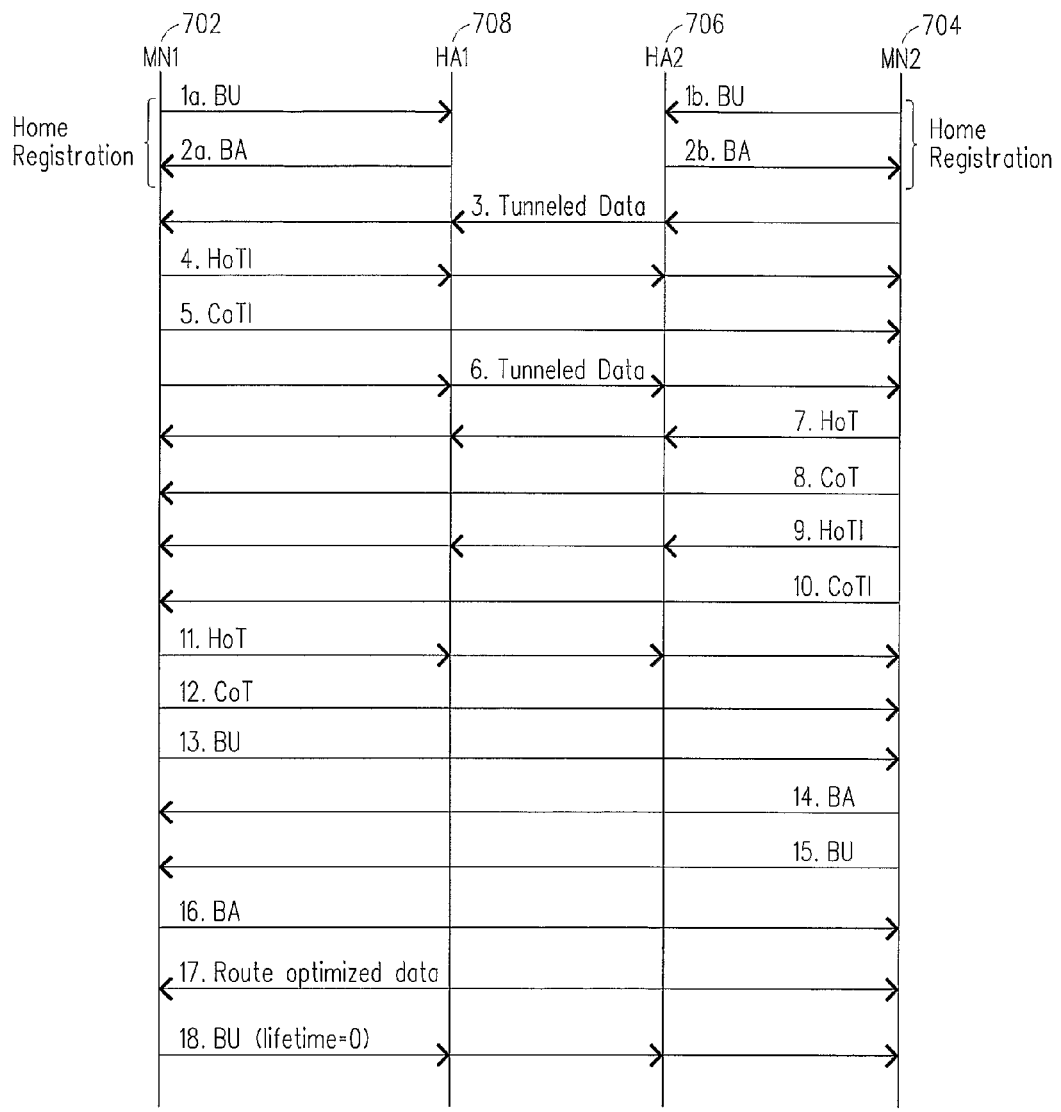
Figure 8:
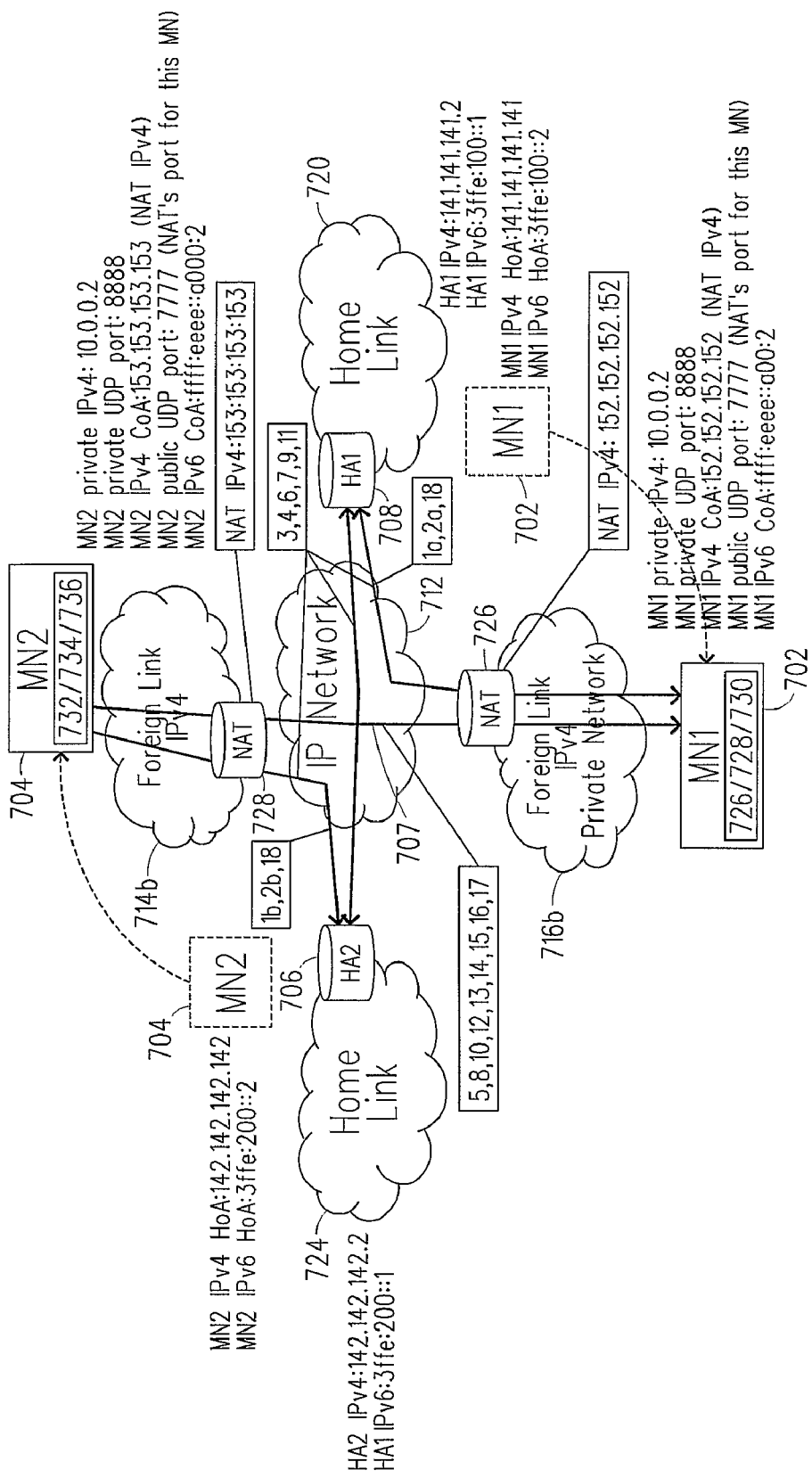

Referring to FIGS. 6-8, there are shown several diagrams that are used to help describe the second embodiment of the route optimizing method 600 in accordance with the present invention. Basically, the route optimizing method 600 enables an IPv6 MN 702 to retain its reachability to another IPv6 MN 704 when either or both nodes 702 and 704 move to IPv4-only access networks 706 and 714. The MN 702 can use the route optimization method 600 between another MN 704 in a heterogeneous environment with some assumptions.

First, the MNs 702 and 704 both need to have an IPv4 address and an IPv6 address. In addition, the MNs 702 and 704 must support the tunnelling of IPv6 packets inside an IPv4/UDP tunnel 707. In addition, the MNs 702 and 704 must support the "IPv4 Care-of Address Option". This option is used by each of the MNs 702 and 704 to learn their own globally routable IPv4 address and UDP port and to inform the other MN 702 and 704 to which IPv4 address it must tunnel the route optimized IPv6 packets. It should be noted that the MNs 702 and 704 can not optimize the routing between each other if they are situated in access networks which are using different address versions.

Figure 2B:
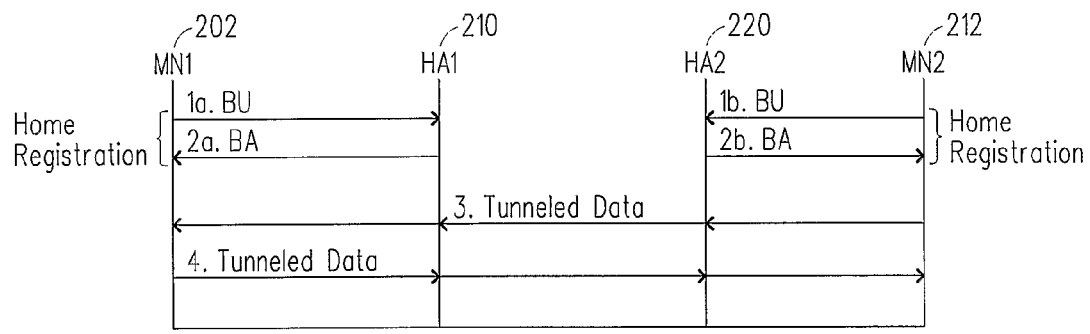
FIGS. 2A and 2B (PRIOR ART) show two diagrams that are used to help explain a known solution which does not use a route optimization procedure to address the mobility management problem in a scenario where an IPv6 MN retains its reachability to another IPv6 MN even when both IPv6 MNs move to IPv4-only access networks.
Figure 2A:
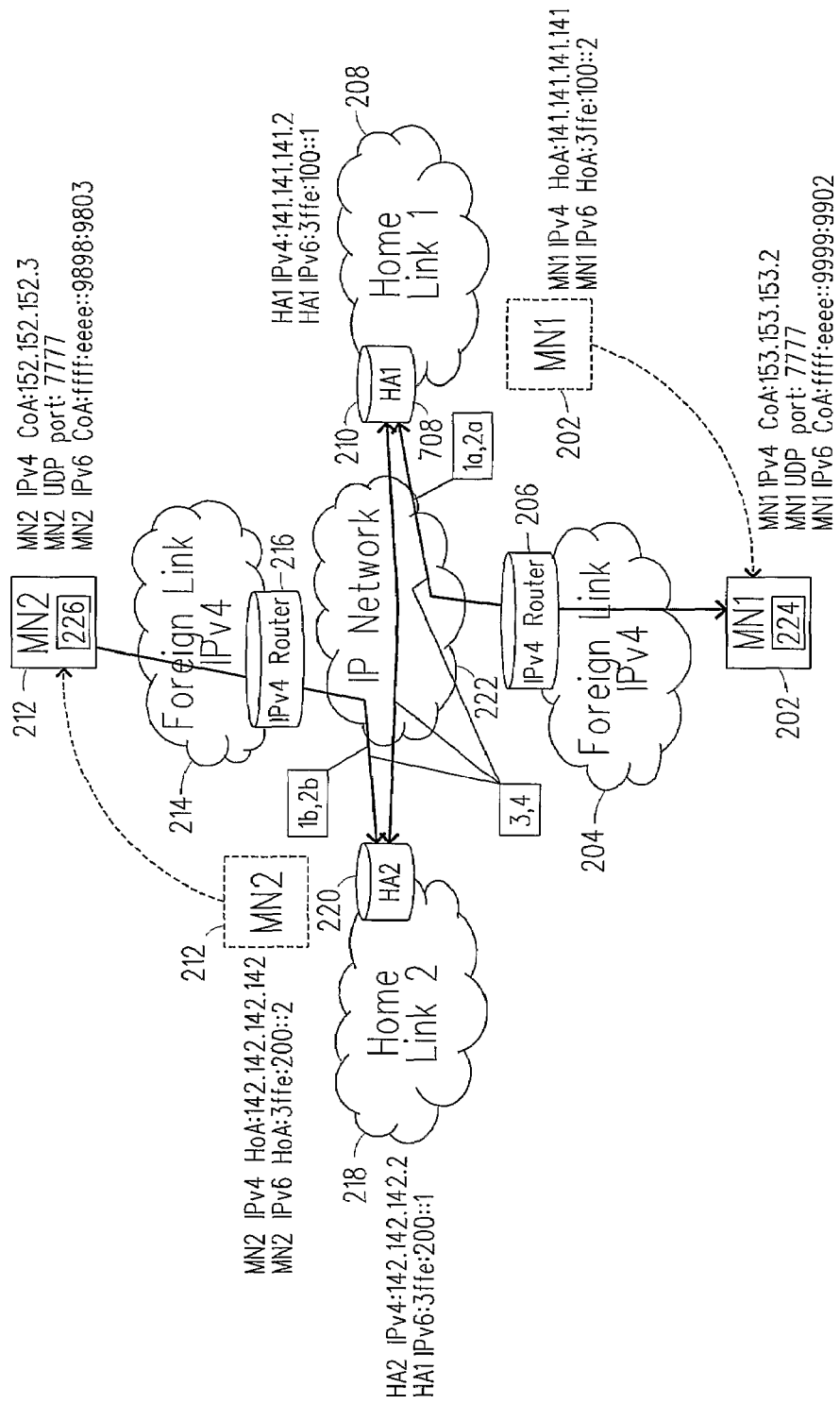

Prior to discussing how the route optimization method 600 can be used in two different scenarios which are shown FIGS. 7 and 8, a brief discussion is provided about the basic steps of the route optimization method 600. First, the MN 702 (MN1) determines the IPv4 reachability of the MN 704 (MN2) by checking if MN 704 is sending the IPv4 Care-of Address option in its traffic which is transmitted through two HAs 706 and 708 to MN 702 (see step 602 in FIG. 6)(see also FIGS. 7 and 8). If yes, then MN 702 determines if MN 704 can establish an IPv4/UDP bi-directional tunnel 707 through the Internet 712 directly between the MNs 702 and 704 (see step 604 in FIG. 6). If yes, then MN 702 establishes one direction of the IPv4/UDP bi-directional tunnel 707 with MN 704 (see step 606 in FIG. 6). Likewise, the MN 704 also determines the IPv4 reachability of MN 702 by checking if MN 702 is sending the IPv4 Care-of Address option in its traffic which is transmitted through two HAs 708 and 706 to MN 704 (see step 608 in FIG. 6)(see also FIGS. 7 and 8). If yes, then MN 704 determines if MN 702 can establish the IPv4/UDP bi-directional tunnel 707 through the Internet 712 directly between the MNs 702 and 704 (see step 610 in FIG. 6). If yes, then MN 704 establishes one direction of the IPv4/UDP bi-directional tunnel 707 with MN 704 (see step 612 in FIG. 6). Thereafter, the IPv6 traffic is routed within the IPv4/UDP bi-directional tunnel 707 back-and-forth between the MNs 702 and 704 (see step 614 in FIG. 6). If the determination in either of the steps 602, 604, 608 and 610 is no, then the IPv4/UDP bi-directional tunnel 707 is not established and the MN 702 must send/receive the IPv6 traffic to/from the MN 704 through both the Internet 712 and both HAs 706 and 708 (see step 616 in FIG. 6) (see FIG. 2A). A description about how steps 602, 604 . . . 616 can be implemented is described in detail below with respect to the two scenarios shown in FIGS. 7 and 8.

Referring to FIGS. 7A and 7B, there is shown a diagram and a signaling flow diagram that are used to help explain how the route optimizing method 600 enables an IPv6 MN 702 to retain its reachability to another IPv6 MN 704 when both of them have moved to IPv4-public access networks 716a and 714a. As shown in FIG. 7A, the first IPv6 MN 702 is located in an IPv4-public access network 716a which has an IPv4 router 718. The first MN 702 moved to the IPv4-public access network 716a from a HL 720 which has a HA 708. The second IPv6 MN 704 is located in an IPv4-public access network 714a which has an IPv4 router 722. The second MN 704 moved to the IPv4-public access network 714a from a HL 724 which has a HA 706. And, the first MN 702 is able to communicate with the second MN 704 through the IPV4/UDP bi-directional tunnel 707 via the Internet 712 as discussed next.

As shown in FIGS. 7A and 7B, the first MN 702 performs a home registration with the HA 708 after it moves from the HL 720 to the IPv4-public access network 716a (see signals 1a and 2a). To perform the home registration, the first MN 702 sends a BU to the HA 708 (signal 1a). Since, the first MN 702 is located in the IPv4-public access network 204 it adds an IPv4 Care-of address option to the BU to learn its global IPv4 address and UDP port. Then, the HA 708 sends the MN 702 a BA which carries the IPv4 Care-of address option holding the MN's global IPv4 address and the UDP port (signal 2a). Likewise, the second MN 704 sends a BU to the HA 706 (signal 1b). Since, the second MN 704 is located in the IPv4-public access network 714a it adds an IPv4 Care-of address option to the BU to learn its global IPv4 address and UDP port. Then, the HA 706 sends the MN 704 a BA which carries the IPv4 Care-of address option holding the MN's global IPv4 address and UDP port (signal 2b). After the home registration, the traffic between the MNs 702 and 704 can be route optimized in accordance with method 600 as follows:

1a and 1b. BU: Both MNs 702 and 704 send BU to their respective HAs 708 and 706 when they move to new IPv4-only access networks 716a and 714a. Assuming the networks are IPv4 networks, each MN 702 and 704 adds the IPv4 Care-of address option to the BU messages to learn its global IPv4 address and UDP port. These steps are part of the home registration process.

2a and 2b. BA: The home registrations are complete after the MNs 702 and 704 receive the BAs from HAs 708 and 706. The BA messages also carry the IPv4 Care-of address option holding the MN's global IPv4 address and UDP port. The steps are part of the home registration process.

3. Tunneled data: The MN 702 receives tunnelled data from the MN 704. This traffic holds the IPv4 Care-of address option carrying the global IPv4 address and UDP port of MN 704. It should be appreciated that if MN 702 is located in an IPv6 access network it will not initiate the route optimization if the packets arriving to it have the "IPv4 Care-of Address Option" in them. Also, if the two MNs 702 and 704 are in IPv6 access networks the route optimization is done normally [see RFC 3775].

4. HoTI: The MN 702 sends the HoTI message to MN 704. The HoTI message is tunneled inside an IPv4/UDP tunnel to the HA 708. The HA 708 then sends the HoTI message to the HA 706. The HA 706 tunnels the packet to MN 704. In the HoTI message, there is a flag set in the reserved field to let the MN 704 know that MN 702 might want to tunnel traffic between the two MNs 702 and 704.

5. CoTI: The MN 702 also sends a CoTI message to MN 704. The CoTi packet is tunneled directly to the MN 704 using its IPv4 CoA and the UDP port number specified in the "IPv4 Care-of Address Option". In the CoTI message, one bit from the reserved field is set and used as a flag to let the MN 704 know that the MN 702 might want to tunnel traffic between the two nodes 702 and 704. In order for the MN 704 to receive the CoTI message it has to listen to the UDP port it uses for tunnelling IPv6 traffic inside the IPv4/UDP tunnel 707.

6. Tunneled Data: Before the route optimization is completed, the MN 702 sends packets to MN 704. The MN 702 adds the "IPv4 Care-of Address Option" into the tunneled packets. These tunneled packets cause the MN 704 to initiate the route optimization with the MN 702.

7. HoT: The MN 704 answers the HoTI message sent by MN 702 with the HoT message if MN 704 supports the IPv4/UDP tunneling. This packet is sent to the HoA of the MN 702 and is tunnelled via the HAs 706 and 708 to MN 702. In addition, the MN 704 sets a flag in the reserved field of the HoT message if it is capable of tunneling IPv6 packets inside an IPv4/UDP tunnel 707. It should be noted if the HoTI message did not have the flag set in the reserved field of the message, then the MN 704 would not reply to the HoTI message.

8. CoT: The MN 704 answers the CoTI message sent by the MN 702 with the CoT message if the MN 704 supports the IPv4/UDP tunneling. This packet is tunneled directly to the IPv4 CoA and UDP port of the MN 702 which were provided in the "IPv4 Care-of Address Option" in the CoTI message. In addition, the MN 704 sets a flag in the reserved field of the CoT message if it is capable of tunneling IPv6 packets inside an IPv4/UDP tunnel 707. It should be noted if the CoTI message did not have the flag set in the reserved field of the message then the MN 704 would not reply to the CoTI message.
9. HoTI: The MN 704 initiates the route optimization procedure when it receives tunneled traffic from the MN 702 and these packets have the "IPv4 Care-of Address Option" in them. The MN 704 initiates the procedure by sending a HoTI message to the IPv6 home address of MN 702. The HoTI message is tunneled via the HAs 706 and 708 to MN 702. In the HoTI message, there is a flag set in the reserved field to let the MN 702 know that MN 704 might want to tunnel traffic between the two MNs 702 and 704.
10. CoTI: The MN 704 also sends a CoTI message to MN 702. The CoTi packet is tunneled directly to the MN 702 using its IPv4 CoA and the UDP port number specified in the "IPv4 Care-of Address Option". In the CoTI message, one bit from the reserved field is set and used as a flag to let the MN 702 know that the MN 704 might want to tunnel traffic between the two nodes 702 and 704. To receive the CoTI message, the MN 702 has to listen to the UDP port it uses for tunnelling IPv6 traffic inside the IPv4/UDP tunnel 707.
11. HoT: The MN 702 answers the HoTI message sent by MN 704 with the HoT message if MN 704 supports the IPv4/UDP tunneling. This packet is sent to the HoA of the MN 704 and is tunnelled via the HAs 706 and 708 to MN 704. In addition, the MN 702 sets a flag in the reserved field of the HoT message if it is capable of tunneling IPv6 packets inside an IPv4/UDP tunnel 707. It should be noted if the HoTI message did not have the flag set in the reserved field of the message then the MN 702 would not reply to the HoTI message.
12. CoT: The MN 702 answers the CoTI message sent by the MN 704 with the CoT message if the MN 702 supports the IPv4/UDP tunneling. This packet is tunneled directly to the IPv4 CoA and UDP port of the MN 704 which were provided in the "IPv4 Care-of Address Option" in the CoTI message. In addition, the MN 702 sets a flag in the reserved field of the CoT message if it is capable of tunneling IPv6 packets inside an IPv4/UDP tunnel 707. It should be noted if the CoTI message did not have the flag set in the reserved field of the message then the MN 702 would not reply to the CoTI message.
13. BU: After the MN 702 has received the HoT and the CoT messages from the MN 704 it will send a BU to the MN 704 only if both of the messages had the flag set in the reserved field. The BU is tunneled directly to the IPv4 CoA and UDP port of MN 704. MN 702 also adds a BUL entry in which it adds the IPv6 HoA and CoA and the IPv4 CoA and UDP port of the MN 704. MN 702 also adds the routing table entry for the IPv4/UDP bi-directional tunnel 707 to MN 704.
14. BA: The MN 704 adds a BC entry for the MN 702 when it receives the BU. Into this entry, the MN 704 adds the IPv6 HoA and CoA and the IPv4 CoA and UDP port of MN 702. The MN 704 also adds the IPv4/UDP bi-directional tunnel 707 to MN 702 to its routing table. When the routing table and BC have been updated, then the MN 704 tunnels a BA message to the MN 702 inside the IPv4/UDP tunnel 707.
15. BU: After the MN 704 has received the HoT and the CoT messages from the MN 702 it will send a BU to the MN 702 only if both of the messages had the flag set to the reserved field. The BU is tunneled directly to the IPv4 CoA and UDP port of MN 702. MN 704 also adds a BUL entry in which it adds the IPv6 HoA and CoA and the IPv4 CoA and UDP port of the MN 702. MN 704 also adds a routing table entry for the IPv4/UDP bi-directional tunnel 707 to MN 702.
16. BU: The MN 702 adds a BC entry for the MN 704 when it receives the BU. Into this entry, the MN 702 adds the IPv6 HoA and CoA and the IPv4 CoA and UDP port of the MN 704. The MN 702 also adds the IPv4/UDP bi-directional tunnel 707 to MN 704 to its routing table. When the routing table and BC have been updated, then the MN 702 tunnels a BA message to the MN 704 inside the IPv4/UDP tunnel 707.
17. Route Optimized Data: After both MNs 702 and 704 have received a BA for the BU's they sent, then the route optimization procedure has been finished and the IPv6 traffic between the two MNs 702 and 704 is routed directly to one and another inside the IPv4/UDP bi-directional tunnel 707.
18. BU (lifetime=0): If MN 702 for example moves to an IPv6 access network while it has binding with MN 704 which is attached to an IPv4 access network it tunnels a BU message (lifetime=0) to the MN 704 via the two HAs 706 and 708 after it has performed the home registration. In this BU, the lifetime for the binding is set to zero to let the MN 704 know that the traffic can no longer be route optimized between the two MNs 702 and 704. It should be appreciated that if one of the MNs 702 and 704 move to another IPv4 access network the bindings between them need to be updated by sending a new BU which includes the new IPv4 CoA in the "IPv4 Care-of Address Option".

In addition, the MN 702 (MN1) includes a routing table 726, a binding update list 728, and a binding cache 730. And, the MN 704 (MN2) includes a routing table 732, a binding update list 734, and a binding cache 736. Exemplary routing tables 726 and 732, binding update lists 728 and 734 and binding caches 730 and 736 are provided below:

| MN1 Routing Table 726: | | |
| --- | --- | --- |
| Destination: | Next hop: | Intf: |
| "HA1 IPv6" | "HA1 IPv4" | UDP tunnelintf0 |
| "MN2 IPv6 CoA" | "MN2 IPv4 CoA" | UDP tunnelintf1 |
| "HA1 IPv4" | "default IPv4 router" | intf0 |
| "MN IPv4 CoA" | "default IPv4 router" | Intf0 |

| MN1 Binding Update List 728: |
| --- |
| "MN2 IPv6 CoA"<-> "MN IPv6 CoA" <-> "MN1 IPv6 HoA"<-> "HA IPv6" |
| "MN2 IPv4 CoA"<-> "MN IPv4 CoA" <-> "MN IPv4 HoA" <-> "HA IPv4" |

| MN1 Binding Cache 730: |
| --- |
| "MN2 IPv6 HoA" <-> "MN2 IPv6 CoA" |
| "MN2 IPv4 HoA" <-> "MN2 IPv4 CoA" |

| MN2 Routing Table 732: | | |
|---|---|---|
| Destination: | Next hop: | Intf: |
| "HA2 IPv6" | "HA1 IPv4" | UDP tunnelintf0 |
| "MN1 IPv6 CoA" | "MN1 IPv4 CoA" | UDP tunnelintf1 |
| "HA2 IPv4" | "default IPv4 router" | intf0 |
| "MN1 IPv4 CoA" | "default IPv4 router" | Intf0 |

| MN2 Binding Update List 734: |
|---|
| "MN1 IPv6 CoA"<-> "MN2 IPv6 CoA" <-> "MN2 IPv6 HoA"<-> "HA2 IPv6" |
| "MN1 IPv4 CoA"<-> "MN2 IPv4 CoA" <-> "MN2 IPv4 HoA"<-> "HA2 IPv4" |

| MN2 Binding Cache 736: |
|---|
| "MN1 IPv6 HoA" <-> "MN1 IPv6 CoA" |
| "MN IPv4 HoA" <-> "MN IPv4 CoA" |

Referring to FIG. 8, there is shown a diagram used to help explain how the route optimizing method 600 enables an IPv6 MN 702 to retain its reachability to another IPv6 MN 704 when both of them have moved to IPv4-private access networks 716b and 714b. As shown in FIG. 8, the first IPv6 MN 702 is located in an IPv4-private access network 716b which has a NAT 726. The first MN 702 moved to the IPv4-private access network 716b from a HL 720 which has a HA 708. The second IPv6 MN 704 is located in an IPv4-private access network 714b which has a NAT 728. The second MN 704 moved to the IPv4-private access network 714b from a HL 724 which has a HA 706.

The MN 702 is able to communicate with the second MN 704 via the IPv4/UDP bi-directional tunnel 707 as discussed above with respect to FIGS. 7A and 7B except that in this case the home registration procedure is different due to the presence of NATs 726 and 728. The differences in the home registration process is described next. When the MN 702 (for example) discovers that it is attached to an IPv4-private access network 716b it sends a BU message to it's HA 708. The MN 702 adds the "IPv4 Care-of Address Option" to the BU message. In particular, the MN 702 uses its IPv4 address as the care-of address and the source UDP port as the UDP port. Because, the IPv4-private access network 716b is behind NAT 726, the option will not get translated since it is inside the IPv6 header and these headers are encrypted with IPSec. Thus, when the HA 708 receives the BU it compares the source address and UDP port of the outer headers of the tunneled packet with the IPv4 address and UDP port in the "IPv4 Care-of Address Option". If they are different, then the HA 708 copies the IPv4 source address and UDP port of the NAT 726 to the option from the received IPv4 header. This option is added into the BA which is sent back to the MN 702. In this way, when MN 702 receives the BA it will know if it is situated behind a NAT. In addition, MN 702 knows the globally routable IPv4 address and the UDP port which are needed for tunneling IPv6 traffic inside the IPv4/UDP tunnel 707. In this example, the same home registration procedure is followed by MN 704 since it is located behind NAT 728. In addition, the MN 702 includes a routing table 726, a binding update list 728, and a binding cache 730. And, the MN 704 includes a routing table 732, a binding update list 734, and a binding cache 736. Exemplary routing tables 726 and 732, binding update lists 728 and 734 and binding caches 730 and 736 have been provided above.

It should be understood that the present invention can be used in other scenarios in addition to the aforementioned scenarios discussed above with respect to FIGS. 3-8. The following TABLE indicates some of the different scenarios in which the present invention can be utilized.

| Mobile node | Another node (CN or MN) | Same Home Network | Nodes in same Network | Comment |
|---|---|---|---|---|
| Remote IPv4 | Remote IPv4 | No | No | |
| Remote IPv4 | Home | No | No | |
| Remote IPv6 | Home | No | No | Tunnel not used (1) |
| Home | Remote IPv6 | No | No | Tunnel not used (2) |
| Home | Remote IPv4 | No | No | |
| Remote IPv4 | Remote IPv4 | Yes | No | |
| Remote IPv4 | Home | Yes | No | |
| Remote IPv6 | Home | Yes | No | Tunnel not used (1) |
| Home | Remote IPv4 | Yes | No | |
| Home | Remote IPv6 | Yes | No | Tunnel not used (2) |
| Remote IPv4 | Remote IPv4 | No | Yes | |
| Remote IPv4 | Home | No | Yes | |
| Remote IPv6 | Home | No | Yes | Tunnel not used (1) |
| Remote IPv4 | Remote IPv4 | Yes | Yes | |

(1) In this scenario, there will not be an IPv4/UDP tunnel set up between the MN and another node but the flags in the HoTI/HoT and CoTI/CoT messages must be used.
(2) See comment 1 above and also if the another node is only a CN it can't move to another network so this scenario is logical only if the another node is a MN.

Following are some additional features associated with the route optimization method 600:

If a third MN (not shown) that does not support the solution of the present invention, receives tunneled traffic from MN 702 (for example) which adds the "IPv4 Care-of Address Option" into the IPv6 headers of the packets it won't be able to perform the route optimization procedure with this MN 702. Because, while the MN 702 is in the IPv4 access network, the IPv6 CoA of the MN 702 is not a globally routable IPv6 address and the HoTI and CoTI messages which the third MN sends can not be received by MN 702.

If a third MN (not shown) that does not support the solution of the present invention, receives tunneled traffic from the MN 702 (for example) and both of these MNs are attached to an IPv6 access network (not shown) then the two MNs will not complete the route optimization. Because, the third MN will not set the flag in the reserved field of the HoTI/HoT and CoTI/CoT messages. Moreover, the traffic will not be route optimized between the two nodes because MN 702 can not guarantee that it won't move at some point of time to an IPv4 access network and if this happens the MN 702 can not be sure that the third MN supports the tunneled BU (with lifetime set to zero).

While a MN 702 (for example) is attached to an IPv4 access network 716 it adds the "IPv4 Care-of Address Option" to its IPv6 packets. If the MN 702 continuously receives tunneled traffic from a third MN that does not implement the present invention, then MN 702 might make a note of the fact that the third MN does not support route optimization and stop adding these options into the packets to reduce the overhead of the packets.

The "IPv4 Care-of Address Option" could be TLV coded and it must hold the IPv4 care of address and the UDP port. This information could also be encoded into the IPv6 CoA of the MN 702 and 704 when it is attached to an IPv4 access network, but then some flag is needed to inform the receiver that the CoA is not a globally routable IPv6 address. This could be done with for example using RH2 which is specified in the aforementioned RFC 3775. The present invention is a more simple solution even though it adds some overhead to the traffic.

If MN 702 (for example) moves from one IPv4 access network to another IPv4 access network, then it must register its new IPv4 Care-of Address with the HA 708. This is done by tunneling the BU inside the IPv4/UDP tunnel. After this, the MN 702 can refresh all the bindings in its binding update list (BUL) with the new IPv4 Care-of Address. The MN 702 then sends a BU to each MN/CN it has a binding with to inform them that its Care-of address has changed. After this, all the traffic can be sent to its new location.

If one of the MNs (e.g., MN 702) moves to an IPv6 network while the other MN (e.g., MN 704) stays in the IPv4 network, then the established bi-directional tunnel must be deleted from the routing tables in MNs 702 and 704. The MN 702 which has made the move from an IPv4 access network to an IPv6 access network can initiate this by tunneling the BU message with lifetime=0 through it's HA 708. When the receiving MN 704 receives this tunneled BU from it's HA 706, it checks its Binding Update List (BUL) and BC with the Home Address of the tunneled packet and deletes the corresponding BUL entry. After this, the traffic between the two MNs 702 and 704 needs to be tunneled via their HA's 706 and 708. A similar procedure is also performed if the two MNs 702 and 704 have optimized the routing between them while they both are in IPv6 access networks and one of them moves to an IPv4 access network. The BU with lifetime=0 will be tunneled via HA to the other MN.

The present invention can also be used if anyone of the MNs is connected to an intranet, extranet and even anyone of the MNs is connected to an intranet/extranet which is then connected to the Internet.

Although two embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A mobile node that communicates with another node by transmitting and receiving IPv6 traffic within an IPv4/UDP bi-directional tunnel through an IP network without routing the IPv6 traffic through a home agent of the mobile node, wherein at least one of the mobile node and the another node is located in an IPv4 access network, and wherein when said another node is a correspondent node then said mobile node is operable to:
   determine if said correspondent node has an IPv4 capability;
   if yes, determine if said correspondent node can establish said IPv4/UDP tunnel;
   if yes, establish said IPv4/UDP tunnel with said correspondent node; and
   route said IPv6 traffic to said correspondent node within said IPv4/UDP tunnel.

2. The mobile node of claim 1, wherein said IPv4 access network is an IPv4 public access network or an IPv4 private access network.

3. The mobile node of claim 1, wherein both of the nodes are located in the same or different IPv4 access networks or one of the nodes is located in an IPv6 access network which also has an IPv4 communication connectivity.

4. The mobile node of claim 1, wherein said second determining step and said establishing step further includes:
   sending, via a home agent, a HoTI message to an IPv6/IPv4 address of said correspondent node, wherein said HoTI message has a set flag indicating a desire to establish said IPv4/UDP tunnel;
   sending a CoTI message to an Ipv4 address and a UDP port of said correspondent node, wherein said CoTI message has a set flag indicating a desire to establish said IPv4/UDP tunnel;
   receiving, from said correspondent node via said home agent, a HoT message with a set flag indicating said correspondent node is capable of tunneling said IPv6 traffic in said IPv4/UDP tunnel;
   receiving, from said correspondent node, a CoT message with a set flag indicating said correspondent node is capable of tunneling said IPv6 traffic in said IPv4/UDP tunnel;
   sending a BU message within said IPv4/UDP tunnel to said correspondent node; and
   receiving, from said correspondent node, a BA message that was sent within said IPv4/UDP tunnel.

5. The mobile node of claim 1, wherein when said another node is a second mobile node then said mobile node performs the following steps:
   determining if said second mobile node has an Ipv4 capability;
   if yes, determining if said second mobile node can establish said Ipv4/UDP bi-directional tunnel;
   if yes, establishing said IPv4/UDP bi-directional tunnel with second mobile node; and routing said IPv6 traffic within said IPv4/UDP bi-directional tunnel between said first IPv6 mobile node and said second IPv6 mobile node.

6. The mobile node of claim 5, wherein said two determining steps and said establishing step performed by said first mobile node includes:
   checking if said second mobile node has an IPv4 care-of address and UDP port;
   sending, via the home agent of the first mobile node and the home agent of the second mobile node, a HoTI message to an IPv6/IPv4 address of said second mobile node, wherein said HoTI message has a set flag indicating a desire to establish said IPv4/UDP bi-directional tunnel;
   sending a CoTI message to an IPv4 address and a UDP port of said second mobile node, wherein said CoTI message has a set flag indicating a desire to establish said IPv4/UDP bi-directional tunnel;
   receiving, from said second mobile node via the home agent of the first mobile node and the home agent of the second mobile node, a HoT message with a set flag indicating said second mobile node is capable of tunneling said Ipv6 traffic in said IPv4/UDP bi-directional tunnel;
   receiving, from said second mobile node, a CoT message with a set flag indicating said second mobile node is capable of tunneling said Ipv6 traffic in said IPv4/UDP bidirectional tunnel;

sending a BU message within said IPv4/UDP bi-directional tunnel to said second mobile node; and receiving, from said second mobile node, a BA message that was sent within said IPv4/UDP tunnel.

7. The mobile node of claim 5, wherein: said first mobile node is located behind a network address translator associated with said first IPv4 access network; and/or said second mobile node is located behind a network address translator associated with said second IPv4 access network.

8. A method for route optimization between a mobile node and another node, where at least one of the mobile node and the another node is located in an IPv4 access network, said method comprising the step of:

enabling said mobile node to communicate with said another node (404, 704) by transmitting and receiving IPv6 traffic within an IPv4/UDP bi-directional tunnel through an IP network without routing the IPv6 traffic through a home agent of the mobile node, wherein said mobile node and said another node each have an IPv4 and IPv6 capability, and wherein when said another node is a correspondent node then said enabling step further includes:

determining if said correspondent node has an IPv4 capability;

if yes, determining if said correspondent node can establish said IPv4/UDP tunnel:

if yes, establishing said IPv4/UDP tunnel with said correspondent node; and routing said IPv6 traffic to said correspondent node within said IPv4/UDP tunnel.

9. The method of claim 8, wherein said mobile node is attached to said IPv4 access network and said mobile node performs a home registration procedure with said home agent that assigns said mobile node an IPv4 care-of address.

10. The method of claim 9, wherein when said another node is a second mobile node then said enabling step further includes:

said first mobile node performing the following steps: determining if said second mobile node has an IPv4 capability;

if yes, determining if said second mobile node can establish said IPv4/UDP bi-directional tunnel;

if yes, establishing one direction of said IPv4/UDP bi-directional tunnel with second mobile node; and said second IPv6 mobile node performing the following steps:

determining if said first mobile node has an IPv4 capability;

if yes, determining if said first mobile node can establish said IPv4/UDP bi-directional tunnel;

if yes, establishing another direction of said IPv4/UDP bi-directional tunnel with first mobile node; and said first mobile node and said second mobile node performing the following step: routing said IPv6 traffic within said IPv4/UDP bidirectional tunnel between said first IPv6 mobile node and said second IPv6 mobile node.

11. The method of claim 10, wherein said two determining steps and said establishing step performed by- said first mobile node includes:

checking if said second mobile node has an IPv4 care-of address and UDP port;

sending, via the home agent of the first mobile node and the home agent of the second mobile node, a HoTI message to an IPv6/IPv4 address of said second mobile node, wherein said HoTI message has a set flag indicating a desire to establish said IPv4/UDP bi-directional tunnel;

sending a CoTI message to an IPv4 address and a UDP port of said second mobile node, wherein said CoTI message has a set flag indicating a desire to establish said IPv4/UDP bi-directional tunnel;

receiving, from said second mobile node via the home agent of the first mobile node and the home agent of the second mobile node, a HoT message with a set flag indicating said second mobile node is capable of tunneling said IPv6 traffic in said IPv4/UDP bi-directional tunnel;

receiving, from said second mobile node, a CoT message with a set flag indicating said second mobile node is capable of tunneling said IPv6 traffic in said IPv4/UDP bidirectional tunnel;

sending a BU message within said IPv4/UDP bidirectional tunnel to said second mobile node; and receiving, from said second mobile node, a BA message that was sent within said IPv4/UDP tunnel.

12. The method of claim 10, wherein:

said first mobile node is located behind a network address translator associated with said first Ipv4 access network; and/or said second mobile node is located behind a network address translator associated with said second IPv4 access network.

13. The method of claim 8, wherein said first determining step further includes: checking if said correspondent node has an IPv4 care-of address and UDP port.

14. The method of claim 8, wherein said second determining step and said establishing step further includes:

sending, via a home agent, a HoTI message to an IPv6/IPv4 address of said correspondent node, wherein said HoTI message has a set flag indicating a desire to establish said IPv4/UDP tunnel;

sending a CoTI message to an IPv4 address and a UDP port of said correspondent node, wherein said CoTI message has a set flag indicating a desire to establish said IPv4/UDP tunnel;

receiving, from said correspondent node via said home agent, a HoT message with a set flag indicating said correspondent node is capable of tunneling said IPv6 traffic in said IPv4/UDP tunnel;

receiving, from said correspondent node, a CoT message with a set flag indicating said correspondent node is capable of tunneling said IPv6 traffic in said IPv4/UDP tunnel;

sending a BU message within said IPv4/UDP tunnel to said correspondent node; and receiving, from said correspondent node, a BA message that was sent within said IPv4/0DP tunnel.

15. The method of claim 9, wherein said mobile node is located behind a network address translator associated with said IPv4 access network.

16. The method of claim 9, wherein said IPv4 access network is an IPv4 public access network or an IPv4 private access network and wherein said another node is located in an IPv6 access network or an IPv4/IPv6 access network.

17. The method of claim 8, wherein said correspondent node is a mobile node.

18. A telecommunications network characterized by:
a mobile node; and
an another node, wherein said mobile node communicates with said another node by transmitting and receiving IPv6 traffic within an IPv4 /UDP bi-directional tunnel through an IP network without routing the IPv6 traffic through a home agent of the mobile node, wherein at least one of the mobile node and the another node is located in an IPv4 access network, and wherein when said another node is a correspondent node, then said mobile node is operable to communicate with said another node by performing the following steps:

determining if said correspondent node has an IPv4 capability;
  if yes, determining if said correspondent node can establish said IPv4/UDP tunnel;
  if yes, establishing said IPv4/UDP tunnel with said correspondent node; and
  routing said IPv6 traffic to said correspondent node within said IPv4/UDP tunnel.

19. The telecommunications network of claim 18, wherein when said mobile node is a first mobile node and said another node is a second mobile node, then said first mobile node performs the following steps:

determining if said second mobile node has an IPv4 capability;
  if yes, determining if said second mobile node can establish said IPv4/UDP bi-directional tunnel;
  if yes, establishing one direction of said IPv4/UDP bi-directional tunnel with second mobile node; and
  wherein said second mobile node performs the following steps:
    determining if said first mobile node has an IPv4 capability;
    if yes, determining if said first mobile node can establish said IPv4/UDP bi-directional tunnel;
    if yes, establishing another direction of said IPv4/UDP bi-directional tunnel with the first mobile node; and
  wherein said first mobile node and said second mobile node perform the following step:
    routing said IPv6 traffic within said IPv4/UDP bi-directional tunnel between said first mobile node and said second mobile node.

20. The telecommunications network of claim 18, wherein said mobile node is located in the IPv4 access network and said mobile node completes a home registration process with a home agent in a home access network to obtain a globally routable IPv4 address and UDP port.

21. The network of claim 18, wherein said mobile node uses an IPv4 Care-of Address Option to distribute a globally routable IPv4 address and UDP port.

22. The network of claim 18, wherein said mobile node distributes a globally routable IPv4 address and UDP port by using RH2 and encoding the globally routable IPv4 address and UDP port in an IPv6 Care-of Address.

* * * * *

UNITED STATES PATENT AND TRADEMARK OFFICE
CERTIFICATE OF CORRECTION

| | | |
|---|---|---|
| PATENT NO. | : 8,014,344 B2 | Page 1 of 1 |
| APPLICATION NO. | : 11/916359 | |
| DATED | : September 6, 2011 | |
| INVENTOR(S) | : Mahkonen | |

It is certified that error appears in the above-identified patent and that said Letters Patent is hereby corrected as shown below:

In Column 16, Line 35, in Claim 5, delete "Ipv4" and insert -- IPv4 --, therefor.

In Column 16, Line 38, in Claim 5, delete "Ipv4/UDP" and insert -- IPv4/UDP --, therefor.

In Column 16, Line 62, in Claim 6, delete "Ipv6" and insert -- IPv6 --, therefor.

In Column 16, Line 66, in Claim 6, delete "Ipv6" and insert -- IPv6 --, therefor.

In Column 17, Line 16, in Claim 8, after "node" delete "(404, 704)".

In Column 17, Line 27, in Claim 8, delete "tunnel:" and insert -- tunnel; --, therefor.

In Column 18, Line 21, in Claim 12, delete "Ipv4" and insert -- IPv4 --, therefor.

In Column 18, Line 50, in Claim 14, delete "IPv4/0DP" and insert -- IPv4/UDP --, therefor.

In Column 20, Line 17, in Claim 21, delete "network" and insert -- telecommunications network --, therefor.

In Column 20, Line 20, in Claim 22, delete "network" and insert -- telecommunications network --, therefor.

Signed and Sealed this
Tenth Day of January, 2012

David J. Kappos
*Director of the United States Patent and Trademark Office*